P. L. KIMBALL.
CENTRIFUGAL CREAM SEPARATOR.
APPLICATION FILED APR. 16, 1917.
1,232,811. Patented July 10, 1917.
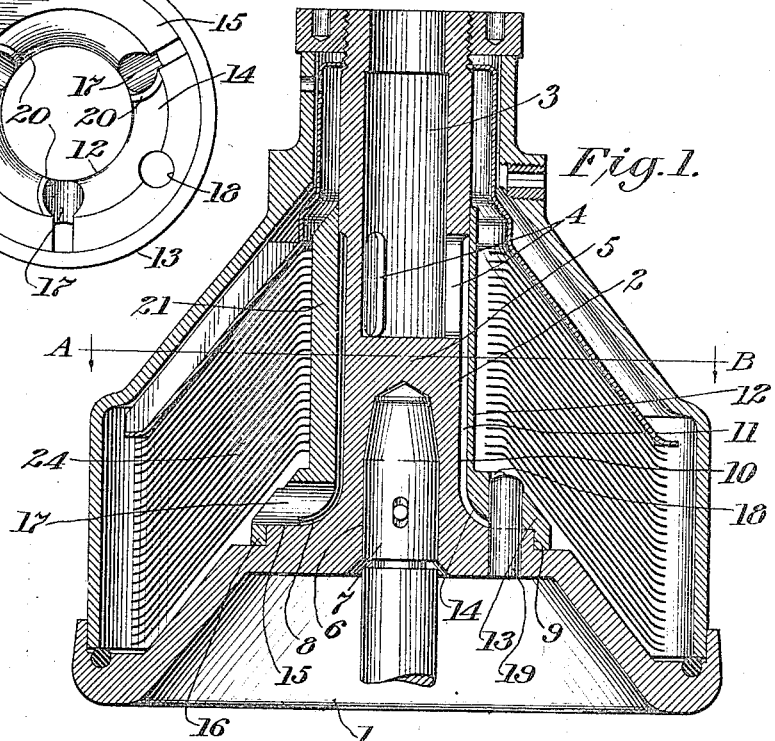
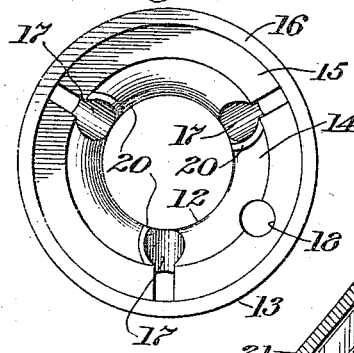
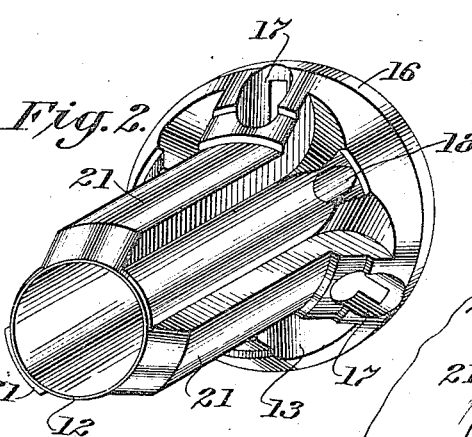
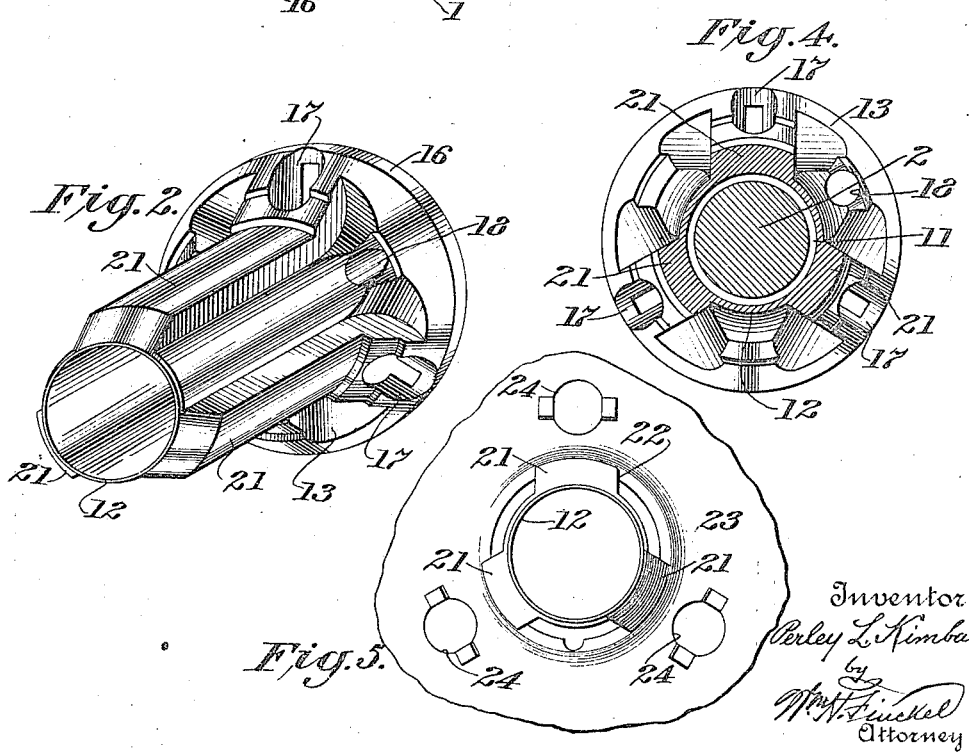
Inventor
Perley L. Kimball
by
Attorney

UNITED STATES PATENT OFFICE.

PERLEY L. KIMBALL, OF BELLOWS FALLS, VERMONT, ASSIGNOR TO THE VERMONT FARM MACHINE COMPANY, OF BELLOWS FALLS, VERMONT, A CORPORATION OF VERMONT.

CENTRIFUGAL CREAM-SEPARATOR.

1,232,811.     Specification of Letters Patent.     Patented July 10, 1917.

Application filed April 16, 1917. Serial No. 162,450.

*To all whom it may concern:*

Be it known that I, PERLEY L. KIMBALL, a citizen of the United States, residing at Bellows Falls, in the county of Windham and State of Vermont, have invented a certain new and useful Improvement in Centrifugal Cream-Separators, of which the following is a full, clear, and exact description.

The object of this invention is to simplify and otherwise improve the construction of cream separators, with special reference to the means for feeding the whole-milk for separation of the cream and discharging the cream and skim milk when separated.

The invention consists in a cream separator bowl having a whole-milk feed tube between which and a surrounding distributer sleeve is formed an annular chamber communicating with the liner or skimmer disks or cones for the separation of the milk constituents, as I will proceed now to explain and finally claim.

In the accompanying drawings illustrating the invention, in the several figures of which like parts are similarly designated, Figure 1 is a vertical section of a cream separator bowl. Fig. 2 is a perspective view of the distributer sleeve. Fig. 3 is a bottom plan view of the distributer sleeve. Fig. 4 is a transverse section of the milk tube and distributer sleeve, the section being taken substantially in the plane of line A B, Fig. 1. Fig. 5 is a fragmentary top plan view beneath the upper disk.

The bowl base 1 may be of any usual or approved construction. Its combined spindle socket and whole-milk feed tube 2 is made integral therewith, the upper portion 3 of said tube being tubular and provided with laterally opening slots 4, and its lower portion separated from the upper by a solid wall 5 and provided with a socket 6 for the driving spindle 7. The base of the feed tube is made concave, as at 8, and merges with the base of the bowl in the vertical shoulder 9. That portion 10 of the exterior of the feed tube extending from about the tops of the slots 4 to the concave base, is of less diameter than the upper portion of the tube, in order to form in connection with the distributer sleeve, next described, a single continuous annular milk distributing chamber 11, which extends uninterruptedly around the feed tube. The interior of the feed tube may be, and preferably is, of uniform diameter, excepting that at the upper portion or whole-milk inlet the diameter is reduced, as shown in Fig. 1, so as to provide a sort of ring or shoulder which serves to prevent the milk as it flows in from overflowing the top end of the tube.

The distributer sleeve 12 just previously referred to, has an internal diameter throughout of substantially the external diameter of the upper portion of the feed tube, so as to form a substantially tight joint with that portion of the milk tube, and the base 13 of this sleeve is recessed at 14 to continue the chamber, and it is also recessed at 15 to form a flange 16 which fits about the shoulder 9 of the base and therewith make a substantially tight joint. This provision of a substantially tight joint at this point also serves to keep the bottom end of the sleeve in a rigidly concentric position relatively to the axis of the bowl. The base of the sleeve is pierced laterally at 17 to form outlets for the milk. This base also is pierced vertically at 18 to engage a pin 19 rising from the base of the bowl in order to fix the location of the sleeve. If desired, or necessary, the base of the sleeve may be provided with walls 20 adjacent one side of the outlets 17 and coöperating with the base of the bowl to separate the streams of outflowing milk. The exterior of the sleeve is provided with columns 21, one of which may be wider than the others to coöperate with corresponding notches 22 in the liner or skimmer disks or cones 23 to insure the proper positioning of these disks or cones in the bowl and to effect the correct registration of the flow passages 24, the skim milk and the cream being discharged from the bowl in any usual or approved way. The openings 24 when the disks or cones are all assembled in the bowl form vertical passages for the upward flow of the incoming whole-milk, which leaves the sleeve at the port openings 17 which are directly in line with the said passages. As the bottom portion of the bowl fills up, the milk rises in these passages 24 and keeps overflowing each successive disk or cone until the bowl is filled.

As will be seen, the feed tube in the bowl is free from grooves or channels, the formation of which involves extra expense in manufacturing and extra trouble to keep clean, and the adjacent and contacting surfaces of the feed tube and the surrounding distributer sleeve are plane and smooth so that the flow of the milk and cream is not obstructed.

Variations in details of construction and the arrangement of parts are permissible within the invention as herein explained and claimed. For example, the feed tube may be made of uniform external diameter and the interior of the sleeve may be of two diameters.

What I claim is:—

1. A separator bowl, having a feed tube of two external diameters and a surrounding distributer sleeve of uniform internal diameter, with a continuous unbroken annular chamber between the two.

2. A separator bowl, having a feed tube, provided with lateral slots, the external diameter of said tube below the tops of said slots being less than the external diameter above said slots, and a surrounding distributer sleeve of substantially uniform internal diameter, whereby an unbroken annular chamber is formed between said tube and sleeve.

3. A cream separator bowl, having a feed tube rising from its bottom on concave lines and extending upwardly therefrom in parallel lines to a given height and having lateral slots and ending in a top portion of greater diameter than the lower portion, and a distributer sleeve of uniform internal diameter surrounding said feed tube.

4. A cream separator bowl, having a feed tube rising from its bottom on concave lines and extending upwardly therefrom in parallel lines to a given height and having lateral slots and ending in a top portion of greater diameter than the lower portion and having a vertical shoulder at its base next to the base of the bowl, and a surrounding distributer sleeve of substantially uniform internal diameter next to the feed tube and fitting the upper portion of the feed tube snugly and provided with a base flange snugly engaging the shoulder.

5. A cream separator bowl, having a feed tube integral with its bottom and having a concave base terminating in a vertical shoulder, said feed tube extending upwardly from its base in parallel lines and provided with lateral slots through which the milk flows into the bowl, and a distributer sleeve having a base conforming to the base of the feed tube and provided with a flange to coöperate with said shoulder to form a substantially tight joint therewith and extending upwardly into engagement with the upper portion of the feed tube above its lateral slots, a continuous unbroken annular chamber being formed between the feed tube and its base and the surrounding sleeve and its base, and lateral openings in the base of the sleeve communicating with said chamber and opening into the bowl.

6. A cream separator bowl, having a feed tube integral with its bottom and having a concave base terminating in a vertical shoulder, said feed tube extending upwardly from its base in parallel lines and provided with lateral slots through which the milk flows into the bowl, and a distributer sleeve having a base conforming to the base of the feed tube and provided with a flange to coöperate with said shoulder to form a substantially tight joint therewith and extending upwardly into engagement with the upper portion of the feed tube above its lateral slots and surrounding said tube, a continuous unbroken annular chamber being formed by and between the adjacent smooth and unbroken walls of the feed tube and its base and the sleeve and its base, and lateral openings in the base of the sleeve communicating with said chamber and opening into the bowl, said bowl having a vertically disposed pin in its base and said sleeve having a vertically disposed hole in its base to coöperate with the said pin to properly position the sleeve in the bowl.

7. A separator bowl, having a base, provided with an upright shoulder, a feed tube extending upwardly from said base in parallel lines and having lateral openings above its base, and a surrounding distributer sleeve having a base conforming to the base of the feed tube and provided with a flange in engagement with the shoulder, the space between the feed tube and sleeve produced by the difference in diameter between said tube and sleeve forming a continuous unbroken annular milk chamber extending from above the lateral openings in the feed tube into the base, the base having lateral openings for establishing communication between said chamber and the surrounding bowl.

8. A separator bowl, having a feed tube rising from its base and terminating at said base in concave lines and having lateral communication above its base with the aftermentioned chamber, a surrounding distributer sleeve having a similar base and forming with the feed tube a continuous annular chamber between the two, the base of the sleeve having lateral openings provided with walls extending to the base of the feed tube, said openings affording communication between the chamber and bowl.

In testimony whereof I have hereunto set my hand this 13th day of April A. D. 1917.

PERLEY L. KIMBALL.

Witnesses:
J. S. LANGWILL,
M. J. PIKE.

Copies of this patent may be obtained for five cents each, by addressing the "Commissioner of Patents, Washington, D. C."